(No Model.)

H. W. GODFREY, C. F. LEAKE & C. E. LUCAS.
PROCESS OF MANUFACTURING FLOOR CLOTH AND LIKE FABRICS.

No. 469,240. Patented Feb. 23, 1892.

Witnesses

Inventors
HENRY W. GODFREY
CHARLES F. LEAKE
CHARLES E. LUCAS
By Baldwin, Davidson & Wight Attorneys

UNITED STATES PATENT OFFICE.

HENRY WILLIAM GODFREY, CHARLES FREDERICK LEAKE, AND CHARLES EDWARD LUCAS, OF STAINES, ENGLAND, ASSIGNORS TO THE LINOLEUM MANUFACTURING COMPANY, LIMITED, OF SAME PLACE.

PROCESS OF MANUFACTURING FLOOR-CLOTH OR LIKE FABRICS.

SPECIFICATION forming part of Letters Patent No. 469,240, dated February 23, 1892.

Application filed October 2, 1891. Serial No. 407,582. (No model.)

*To all whom it may concern:*

Be it known that we, HENRY WILLIAM GODFREY and CHARLES FREDERICK LEAKE, engineers, and CHARLES EDWARD LUCAS, linoleum-manufacturer, subjects of the Queen of Great Britain, all residing at Staines, in the county of Middlesex, England, have invented certain new and useful Improvements in the Process of Manufacturing Floor-Cloth or Like Fabrics, of which the following is a specification.

The object of the present invention is to produce a marbled or marbled-granite appearance upon floor-cloth. For this purpose we cause strips or threads of linoleum or like material to adhere to a granulated surface in the process of manufacture. We cause the backing to pass beneath a hopper, which delivers upon it linoleum or like fragments, the thickness of the layer of fragments being regulated by a straight-edge at the mouth of the hopper, which receives an endwise vibratory motion. We then dust or distribute upon the surface of such fragments, before they have been consolidated by the rollers, strips or threads of linoleum or like material. The fabric then passes to rollers and the manufacture is completed, the strips or threads being incorporated into the surface, giving the appearance of veins. The strips or threads can be produced in various ways. The method we prefer to adopt is to pass linoleum or like material between a heated roller and a fixed surface nearly but not quite concentric with the roller. The material is thus rolled or rubbed into elongated shreds, which are flicked off the roller by a revolving brush and are distributed over the granular material already spread on the backing fabric, or the linoleum or like composition may be rubbed between two flat or conical surfaces and collected, to be afterward distributed in any suitable manner.

Figure 1:
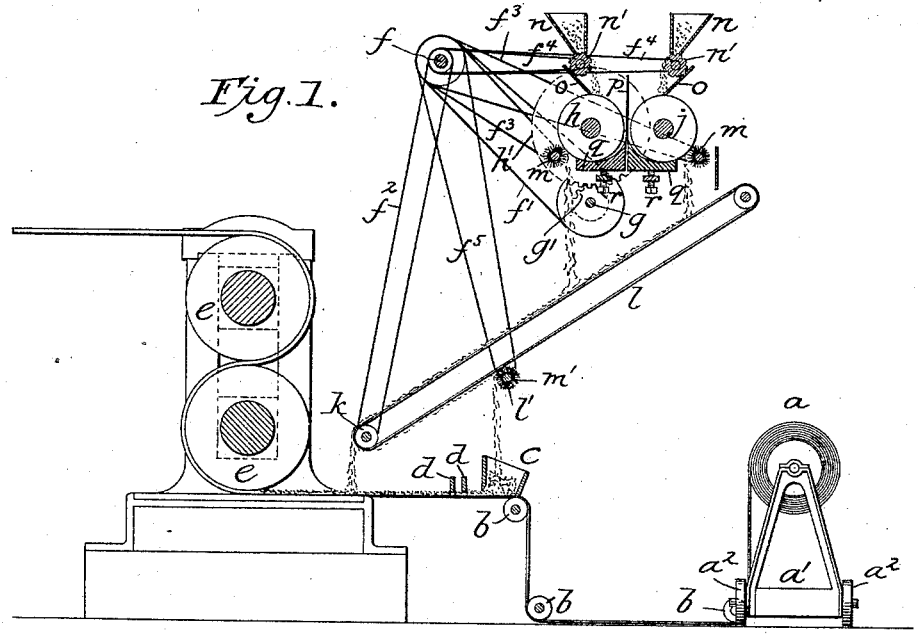
Figure 2:
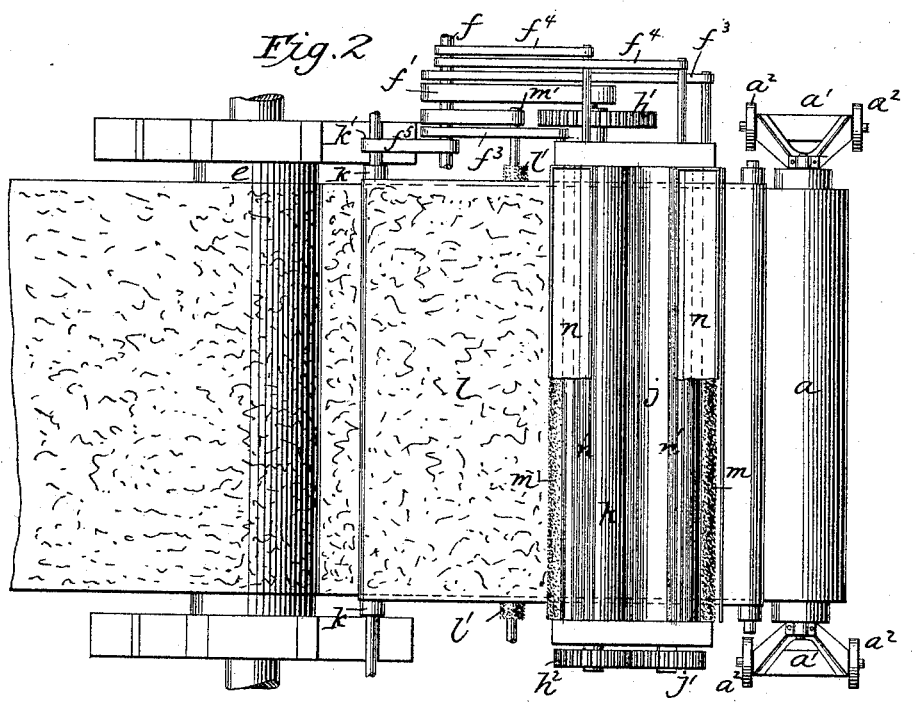

Figure 1 is a diagram view showing a vertical section of the machine we employ, and Fig. 2 is a plan of the same.

$a$ is a roll of canvas or other material to form the backing. It is mounted on a truck $a'$, running on wheels $a^2$. The backing passes round guide-rollers $b\,b$, beneath the mouth of the hopper $c$, and has delivered onto it a layer of linoleum material. The backing then passes under the straight-edges $d\,d$ (which regulate the depth of the layer of material upon it) to the pressing-rolls $e\,e$, which consolidate the material and cause it to adhere to the backing. All this is old and well known and requires no further description.

$f$ is a counter-shaft carrying seven pulleys, over which pass the belts $f'$, $f^2$, $f^3$, $f^3$, $f^4$, $f^4$, and $f^5$. The belt $f'$ passes over a pulley upon the shaft $g$, which has upon it a pinion $g'$, gearing with a spur-wheel $h'$ upon the axis of the roll $h$. The other end of the axis of the roll $h$ has fixed to it the spur-wheel $h^2$, gearing with the spur-wheel $j'$ upon the axis of the roll $j$. The belt $f^2$ passes over a pulley $k'$ upon the axis of the roll $k$, which drives the endless belt $l$. The belt $f^5$ passes over a pulley $m'$ upon the axis of the brush $l'$. The belts $f^3\,f^3$ drive the brushes $m\,m$, and the belts $f^4$ $f^4$ drive the feed-rolls $n'\,n'$ at the mouths of the hoppers $n\,n$.

$o\,o$ are inclines to direct the material from the rolls $n'$ onto the rolls $h$ and $j$.

$p$ is a partition separating the rolls $h$ and $j$, and $q\,q$ are blocks whose surfaces nearly but not quite touch these rolls. As shown, the space between them is greater on the entrance than the exit side.

$r\,r$ are set-screws for adjusting the blocks $q\,q$.

The action of the apparatus is as follows: The rolls $e$ and shaft $f$ are caused to revolve, being driven by a main shaft and gearing. (Not shown in the drawings.) The revolution of the rolls $e$ draws the backing off the roll $a$ under the mouth of the hopper $c$, where it receives a layer of linoleum material. This layer is made smooth and of an even thickness by the straight-edges $d\,d$. The revolution of the shaft $f$ causes the rolls $n'\,n'$ to revolve and deliver linoleum material from the hoppers $n\,n$ onto the rolls $h$ and $j$, the material in the two hoppers being preferably of different colors. This material descends between the rolls and the partition $p$ and is rubbed or rolled between the rolls and the blocks $q\,q$, the strips or threads thus produced being flicked off by the revolving brushes $m$ $m$ onto the endless running band $l$, and the greater part is delivered off the end of the band onto the layer of linoleum material on the backing. Any pieces which stick to the band are flicked off by the brush $m'$ and fall into the hopper $c$ and are incorporated in the body of the ground. The backing, with its layer of linoleum materials and strips or threads, passes to the heated rolls $e\ e$, which consolidate the whole together.

What we claim is—

1. The process of manufacturing floor-cloth and similar fabrics with a marbled or marbled granite surface, which consists in rubbing or rolling linoleum or like material between two surfaces, dusting the strips or threads so formed onto the material forming the ground, and afterward consolidating the whole together.

2. The process of manufacturing floor-cloth and similar fabrics with a marbled or marbled-granite surface, which consists in spreading fragments of linoleum or like material evenly upon a backing of canvas or other fabric, dusting upon such fragments strips or threads of linoleum or like material, and then consolidating the whole together.

HENRY WILLIAM GODFREY.
CHARLES FREDERICK LEAKE.
CHARLES EDWARD LUCAS.

Witnesses to the signature of Henry William Godfrey:

FREDERICK SPANSWICK,
   19 *Southampton Buildings, London.*
JOSEPH LAKE,
   17 *Gracechurch Street, London, E. C.*

Witnesses to the signatures of Charles Frederick Leake and Charles Edward Lucas:

J. HOWE, Jr.,
   *London Road, Staines.*
THOMAS COUSSINS,
   *Claremont Road, Egham.*